United States Patent [19]
Brooke

[11] 3,878,738
[45] Apr. 22, 1975

[54] ACTUATOR FOR A TRANSMISSION MODULATOR VALVE

[75] Inventor: Alan H. Brooke, Hudson, Ohio

[73] Assignee: Rockwell International Corporation, Pittsburgh, Pa.

[22] Filed: Apr. 4, 1974

[21] Appl. No.: 457,911

[52] U.S. Cl. .................. 74/854; 74/865; 251/294
[51] Int. Cl. .................................................. B60k
[58] Field of Search ............ 74/865, 867, 868, 869, 74/872, 854; 251/294

[56] References Cited
UNITED STATES PATENTS

| | | | |
|---|---|---|---|
| 3,738,197 | 6/1973 | Brumm et al. | 74/865 |
| 3,757,612 | 9/1973 | Schaefer | 251/294 X |

*Primary Examiner*—Benjamin W. Wyche
*Assistant Examiner*—Frank H. McKenzie, Jr.

[57] ABSTRACT

A mechanical actuator for a diesel transmission modulator spool valve receives a linear input through a cable in response to throttle pedal position. The end of the cable initially moves as lost motion prior to contacting a first end of a spring having a predetermined constant. The second end of the spring acts on an input arm of a lever pivotally mounted in the actuator. An output arm of the lever is at a predetermined angle with respect to the first arm and provides a predetermined mechanical advantage. A linear input movement compresses the spring to provide a directly corresponding, predetermined force at the output arm for use in modulator valve movement. The interior elements of the actuator may be selectively arranged to accommodate an input cable in either a push or pull mode.

14 Claims, 6 Drawing Figures

ACTUATOR FOR A TRANSMISSION MODULATOR VALVE

BACKGROUND OF THE INVENTION

1. Field of the Invention

This invention relates to an actuator for a modulator spool valve of a transmission and, more specifically, to an actuator that receives a linear input from throttle movement and provides an output force to the modulator valve directly corresponding to the input.

2. Description of the Invention

It is the function of a modulator spool valve to provide hydraulic pressure for affecting the shifting of gears in an automatic transmission of a diesel engine. The modulator valve is biased to assume a normal position but can be moved a very small distance to operating position by a force in opposition to the biasing. The total amount of force needed to operate the modulator valve is predetermined and may be provided by a force from one or more sources in combination for movement of the modulator valve in response thereto. An example of one source may be a varying hydraulic oil pressure signal from the governor capable of providing at least a portion of the total force applied to the modulator valve in opposition to the biasing.

Of significance with regard to the present invention is the fact that it has also been found desirable for proper operation of the modulator spool valve to provide a mechanical device for applying a force to the end of the valve in opposition to the biasing which force directly corresponds to throttle position. This mechanical device should be capable of providing a force as one contribution to the total force on the valve whether the valve is in the normal or operating position and to do so independently of forces which might also be provided from other sources. Its purpose is not directed to the specific movement of the modulator spool valve, but rather to providing one predetermined source of possible opposition to the normal biasing of the modulator valve which might be assisted altered or even opposed by predetermined forces from other sources so that there will be a predictable operation of the modulator valve under varying circumstances at which gear shifting is desired.

Mechanical actuators associated with the throttle have heretofore been used in an effort to provide this predetermined input to the modulator valve. The general function of the actuator is to sense the linear position of the throttle and to convert it into a directly corresponding output force. Specifically, for a small amount of initial movement of the throttle there is no output force and for the remainder of the movement toward full throttle depression the output force is directly proportional to the linear displacement of the throttle with a ratio therebetween which is constant. Since the operation of the modulator valve requires a potential output force with a magnitude which would interfere with throttle operation, the mechanical actuator provides a mechanical advantage to lessen the resistance at the throttle. It should further be noted that the length of linear movement in the actuator which is generated by full throttle displacement is substantially greater than the distance required for full modulator spool valve travel as described hereinabove.

Mechanical actuators previously employed in an attempt to satisfy the above criteria have generally been of two types which both included some means for applying the output force in a direction which is perpendicular to the direction of input movement within the actuator as a result of throttle movement. In the first type, a movable wedge has a slope which results in the desired mechanical advantage while allowing the conversion of movement to a perpendicular direction. In the second type of actuator, an L-shaped lever is pivotally mounted for movement about the extended end of the base leg. Movement of the end of the lever remote from the pivot generates an output movement at the elbow of the lever which has the desired mechanical advantage and a direction which is generally perpendicular to the input. The output movement of both types is used to compress a spring having a predetermined constant an to thereby convert the output movement to a directly corresponding output force capble of being applied to the modulator spool valve.

However, each prior type of mechanical actuator includes some feature which limits its ability to satisfy all of the criteria essential for proper modulator valve operation. For example, the sliding wedge feature has been found to generate substantial frictional forces during movement which have significantly interferred with proper throttle operation. Further, the actuator having an L-shaped lever has produced a force directly proportional to linear throttle movement but with a ratio therebetween which is not constant. The rotation of the lever through a large arcuate path causes variations in both the mechanical advantage and the ratio between the output force and the input movement. Still further, the relatively large arcuate or sliding movement of each member providing the mechanical advantage for its respective actuator results in greater wear of the actuator components and a corresponding shortening of its overall effective life.

SUMMARY OF THE INVENTION

It is therefore an object of the invention to provide a mechanical actuator capable of responding to throttle movement to provide an output force for the operation of a modulator spool valve which output force is directly proportional to the throttle movement with a ratio therebetween which is constant.

It is a further object to provide a mechanical actuator of the type described in which the initial movement of the throttle is lost.

It is another object to provide a mechanical actuator of the type described which has a mechanical advantage to minimize the effect on throttle operation.

It is still another object to provide a mechanical actuator of the type described which is capable of being utilized with either a push or pull mode of response from the throttle.

It is yet another object to provide a mechanical actuator of the type described capable of compensating for a wide range of manufacturing tolerances in the transmission and the modulator.

These and other objects of the invention are provided by preferred embodiments thereof in the form of an actuator for a modulator spool valve of a transmission which is capable of receiving a linear input signal through an input element which input signal directly corresponds to movement of a throttle. The actuator has an output force varying at a predetermined ratio with the linear input signal over at least a portion of the total travel of the input element during movement of the throttle. The output force is capable of providing at least a portion of an input force for movement of the modulator valve against modular valve biasing. The movement of the modulator valve by the input is substantially less than the portion of the total travel of the input element. The actuator includes a housing which is capable of being mounted in a fixed relationship to the transmission and of receiving the input element therein. A lever is pivotally mounted within the housing and has a first lever arm for providing the output force to the modulator valve and a second lever arm. Both of the arms of the lever extend outwardly from the pivotal mounting. The actuator further includes means between the second lever arm and the input element for converting the linear input signal during the portion of the total travel of the input element to a normal signal force on the second lever arm which signal force is directly proportional to the output force. The ratio of the normal signal force to the output force is determined by the relative lengths of the first and second lever arms.

DETAILED DESCRIPTION OF THE PREFERRED EMBODIMENTS

Figure 1:
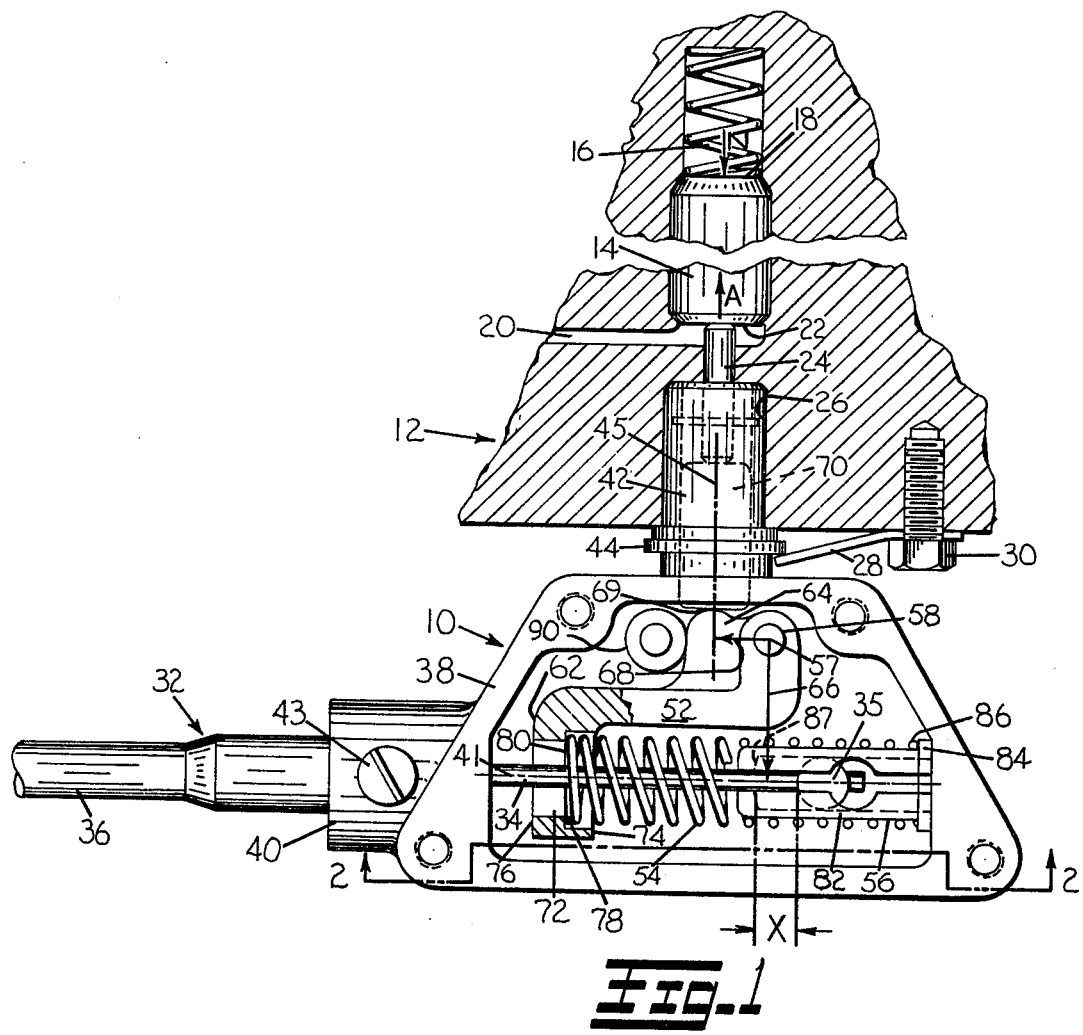
FIG. 1 is a plane view of the preferred mechanical actuator with some portions fragmented or sectioned to reveal various features of the invention.

To provide a full understanding of the preferred mechanical actuator 10 of FIG. 1, it is initially advisable to describe the environment in which the mechanical actuator 10 is to operate. A transmission housing 12 includes therein a modulator spool valve 14. The spool valve 14 is shown in a normal position under the biasing of spring 16, in the direction indicated by the Arrow N, against an end 18 of the spool valve 14. A passage way 20 in the transmission housing 12 allows hydraulic oil pressure to be directed to the other end 22 of the modulator spool valve 14 from the governor (not shown). A modulator spacer 24 is also directed for contact against the end 22 of the modulator spool valve 14 for possible transmission of an output force from the actuator 10 directly to the spool valve 14. The spacer 24 extends outwardly from the valve 14 into a cavity 26 in the outer wall of the transmission housing 12. The specific relationship of the spacer 24 and the cavity 26 with regard to the actuator 10 will be discussed hereinbelow. With the exception of a retaining clip 28 and associated bolt 30 for securing the actuator 10 to the transmission housing 12, other details of the spool valve 14 and transmission housing 12 have been omitted from FIG. 1 as not essential to a basic understanding of the invention.

However, some of the designed parameters of the modulator spool valve 14 should indicate, by way of example, some of the criteria which the mechanical actuator 10 can satisfy. The spring 16 is preloaded to apply a pressure of about 12½ pounds to the end 18 of the spool valve 14. A force applied at the end 22 of the valve 14 overcoming the 12½ pounds opposition of the spring 16 will cause the spool valve 14 to shift from its normal position as shown in a direction indicated by the Arrow A a distance of about 0.005 inches to the operating position. Throughout this description of the embodiments distances in the drawings relative to this 0.005 inches of travel have been exaggerated to provide some indication of the movement that does exist even though it would generally be too small to see.

It is also desirable for a complete understanding of the actuator 10 to provide an example of the requirements for the input signal to the actuator 10 which contributes to possible modulator valve positioning. A cable 32 extends from the throttle linkage (not shown) to the actuator 10 so that an inner operating member 34 within the outer conduit 36 of the cable 32 can move about 1½ inches in response to movement of the throttle linkage. A ball fitting 35 is secured to the end of the inner operating member 34 to provide a means for transferring the movement of the member 34 to the actuator 10. For efficient throttle operation, the force required to move inner operating member 34 should remain less than about 5 pounds throughout possible modulator valve positioning.

For the typical operating criteria established hereinabove, a preferred mechanical actuator 10 is provided. As shown in FIG. 1, the actuator 10 includes a housing 38 having an inlet fitting 40 and an outlet fitting 42. The inlet fitting 40 is adapted for sealed retention of the conduit 36 of the cable 32 by use of screw 43 as the inner operating member 34 extends to the interior of the housing 38 along a central axis 41 shared with the fitting 40. The outlet fitting 42 mates with the cavity 26 of the transmission housing 12 and includes a collar 44. The retaining clip 28 and bolt 30 are positioned to apply pressure to the collar 44 when the outlet fitting 42 is fully positioned within the cavity 26 to thereby secure the actuator 10 to the transmission housing 12 in alignment with the modulator spool valve 14 along a common central axis 45.

Figure 2:
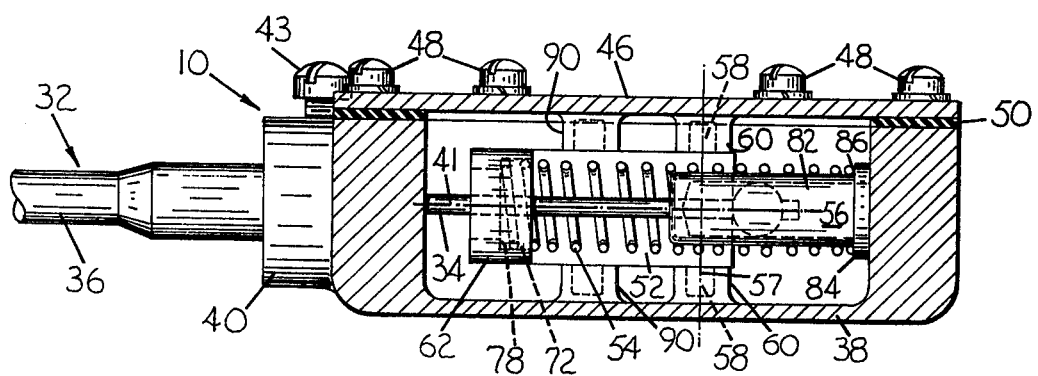
FIG. 2 is a view of the actuator as seen along lines 2—2 of FIG. 1.

The actuator 10 is shown in FIG. 1 with a housing cover 46 and associated retention bolts 48 removed to reveal the elements therein. In FIG. 2, it can be seen that the cover 46, besides providing a sealed fitting for the housing 38 by way of a gasket 50, also includes structural elements essential to the operation of actuator 10.

Specifically, the actuator 10 includes within the housing 38 a lever 52, a conversion spring 54, and a thimble fitting 56. The lever 52 is mounted for pivotal movement about an axis 57 of a pair of axle members 58 which extend outwardly of the lever 52 into bearings 60 formed in the interior walls of the housing 38 and the cover 46. The lever 52 includes an input portion 62 and an output portion 64, respectively, having effective moment arm 66 extending from the lever axis 57 to central axis 45. The output portion 64 is aligned for contact at 69 with one end of an actuator spacer 70 slidably mounted within the outlet fitting 42 so that the other end makes contact with the valve spacer 24 when the actuator 10 is secured to the transmission housing 12. The central axis 45 of the spool valve 14 and the spacers 24 and 70 is perpendicular to the moment arm 68 and extends through the point of contact 69.

The input portion 62 of the lever 52 has an opening 72 extending therethrough to receive the inner operating member 34 as its central axis 41 extends perpendicularly of the moment arm 66. The diameter of the opening 72 at one side 74 of the input portion 62 is larger than that at the other side 76 to define a shoulder 78 therebetween.

While the conversion spring 54 has a spring constant the value and significance of which will be discussed in detail hereinbelow, it includes dimensions which enable a first end 80 to be positioned against the shoulder 78 as it extends outwardly of the side 74 of the input portion 62. The thimble fitting 56 includes a hollow body portion 82 which can be received within the interior of the spring 54 as an annular collar 84 makes contact with the second end 86 of the spring 54. The spring 54 and thimble fitting 56 are coaxially aligned with each other and with the opening 72 of the input portion 62 to also share the axis 41 when the ball fitting 35 of cable 32 is positioned within the hollow body portion 82 of the thimble fitting 56.

As shown in FIG. 1, all elements of and associated with the actuator 10 are in a normal position for no throttle depression. Initial depression of the throttle which causes the linkage to pull the inner operating member 34 of the cable 32 to the left will result in free movement of the ball fitting 35 within the thimble fitting 56. The distance X that the ball fitting 35 will travel prior to making contact with the interior base 87 of the thimble fitting 56 is about ¼ inch and represents the lost motion desired for proper spool valve operation.

When the throttle has been depressed sufficiently to cause the ball fitting 35 to make contact with the base 87 of the thimble fitting 56, the spring 54 will be compressed between the annular collar 84 and the shoulder 78. As the spring 54 is compressed, a force directly proportional to the movement of the ball fitting 35 for the remainder of its travel will be transmitted to the input portion 62 and the lever 52 at the effective moment arm 66. Because the moment arm 66 is approximately three times as long as the moment arm 68 of the output portion 64, the actual force received by the input portion 62 will be approximately ⅓ the force applied at the output portion 64 to the spacer 70 for a contribution toward modulator spool valve 14 positioning. Since the maximum output force would be slightly greater than 12.5 pounds, the input force would be about 4.2 pounds which is below the 5 pounds force that would interfere with throttle operaton. The spring 54 must, therefore, have a constant of the maximum force of 4.2 pounds at the input portion 62 divided by 1¼ inches discussed above. With the throttle in the fully depressed position it can be seen, although exaggerated for purposes of demonstration, that the actuator spacer 70 and, as a result, the spool valve 14 has been moved a distance Z against the biasing of spring 16 of approximately 0.005 inches. This has been accomplished by a slight clockwise rotation of the lever 52 about axis 57 as the compression of spring 54 has acted on the lever 53 to overcome spring 16. Although it should be recongnized that the movement of the lever 52 demonstrated in FIG. 3 might be accomplished due to possible hydraulic pressure from the governor prior to complete depression of the spring 54, it can be seen that the actual movement of input portion 62 which, owing to the mechanical advantage previously discussed, would be at a maximum linear distance $Z_2$ of about 0.015 inches, and not of such a magnitude as would effect the accuracy of the proportional force produced by the spring 54 during its compression.

Figure 4:
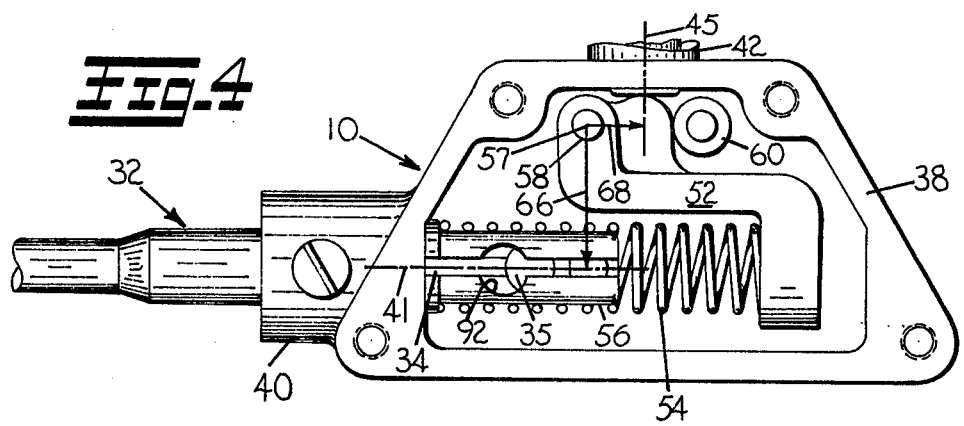
FIG. 4 is a plane view of the actuator like that in FIGS. 1 and 3 but converted to a push mode of operation rather than the pull mode.

In order to explain other features of the preferred mechanical acutator 10 which have not previously been discussed, it should be pointed out that for some applications it is desirable to use a cable associated with the throttle linkage that is intended to operate in a push mode. To this end, the mechanical actuator 10 and the members included therein, are designed to be selectively used in either a push or pull mode of operation. Specifically, an alternative set of bearings 90 have been provided in the interior walls of the housing 38 and the housing cover 46 for relocating the axis 57 of the lever 52 which, as can be seen in FIG. 4, is reversed when utilized in a push mode. It should also be noted that the thimble fitting 56 includes an access slot 92 in the hollow body portion 82 adapted to receive the inner operating member 34 and the ball fitting 35 when properly aligned with the slot 92 and to otherwise retain the ball fitting 35 so positioned therein.

Figure 3:
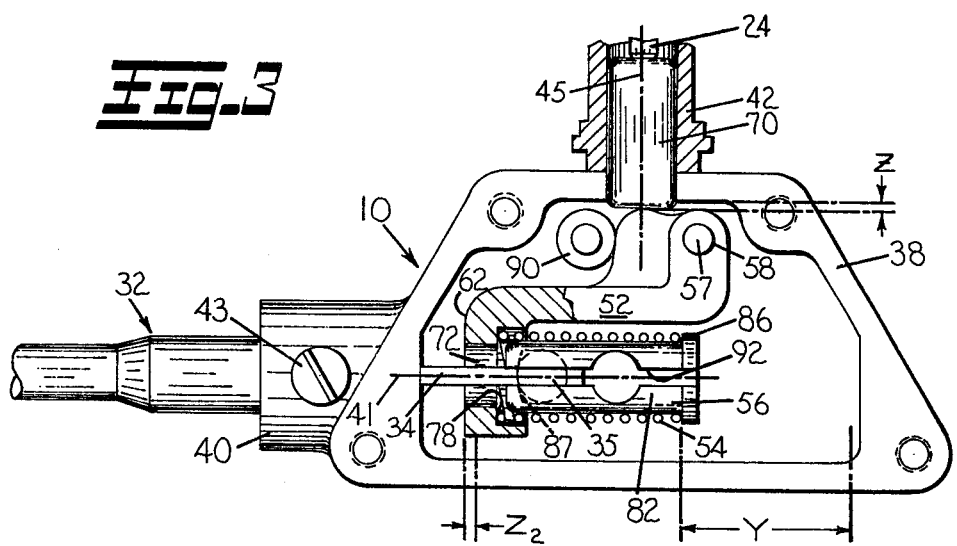
FIG. 3 is a plane view like that of FIG. 1 but showing the actuator at full throttle depression.

During actual installion of the actuator 10 for the pull mode of operation as shown in FIGS. 1–3, the cover 46 is removed to release the lever 52 and allow removal of the spring 54 and thimble fitting 56. The cable 32 is positioned so that the inner operating member 34 extends into the interior of the housing 38 as the screw 43 is tightened against the conduit 36. The inner operating member 34 is then threaded through the opening 72 of the lever 52 and through the center of the spring 54. Compression of the spring 54 by hand allows a sufficient portion of the inner operating member 34 to extend beyond the end 86 of the spring 54 so that it may be aligned with the access slot 92 to allow the ball fitting 35 to be positioned within the body 82 of the thimble fitting 56. When the spring 54 is released, it is aligned with the thimble fitting 56 to cause it to receive the body portion 82 therein as it expands. The lever 52 may then be positioned with the appropriate axle member 58 in the bearing 60 of the housing 38 and, with proper alignment of the axis 57, the housing cover 46 can then be installed on the housing 38 with the other axial member 58 received within its bearing 60 to properly secure the lever 52 for pivotal motion.

To properly set the mechanical actuator, adjustments are made to the inner operating member 34 at the end associated with the throttle linkage. The throttle is positioned to full throttle depression and the inner operating member 34 is pulled to the left until no further movement is possible. This occurs when the ball fitting 35 acts on the base 87 of the thimble fitting 56 to the extent that the thimble fitting 56 makes contact with the shoulder 78 of the lever 52. Since, as shown in FIG. 3, the modulator spool valve 14 would have been shifted to the operating position prior to this extreme positioning of the ball fitting 35, the actual contact between the thimble fitting 56 and the lever 52 at the shoulder 78 is only essential to provide a means by which the one setting the actuator can determine by feel the actual position of the members within the actuator 10. From this known position, the inner operating member 34 is allowed to move slightly to the right as shown in FIG. 3 to a position at which the other end of the inner operating member 34 is rigidly secured to the throttle mechanism. Allowing the throttle to return to an undepressed condition after the inner operating member 34 is secured to the throttle linkage causes the various elements of the actuator 10 to assume the positions as shown in FIG. 1.

To convert the actuator 10 to the push mode, as shown in FIG. 4, the lever 52, spring 54 and thimble fitting 56 are again removed from the housing 38 upon the removal of the housing cover 46. The general purpose is to reverse the lever 52, spring 54, and thimble fitting 56 within the housing 38 while maintaining response along the same center axes 41 and 45 by a simple relocation of the effective moment arms 66 and 68.

The cable 32 is again secured to the inlet fitting 40 but with the inner operating member 34 positioned at the left for eventual movement to the right. Since in the push mode the inner operating member 34 will not initially extend through the spring 54 or the opening 72 of the lever 52, the installation is simpler. The thimble fitting 56 is positioned over the ball fitting 35, the spring 54 is positioned about the body portion 82 of the thimble fitting 56, and the end of the spring 54 is again received within the opening 72 against the shoulder 78 of the lever 52. With the appropriate axle 58 of the lever positioned in the bearing 90 of the housing 38, the cover 46 is installed on the housing 38 to retain the above-mentioned elements in position. The cable 32 is then adjusted in the push mode in a manner like that described for the pull mode so that the acutator 10 will provide the same input to the modulator spool valve 14 in response to throttle operation.

While the description above is directed to the preferred embodiment of the invention, it is proper to qualify some of the various features of this embodiment to demonstrate the full scope of the invention. Initially it should be pointed out that in the particular environment in which the preferred actuator is to be used, the housing includes structure for sealed protection of the members therein. However, the term "housing" as used to describe the invention could include only that minimum structural support which is necessary for the various elements of the actuator to accomplish their function if environment conditions would not interfere.

For another example, it should be obvious that one could simply alter the dimiensions of the actuator elements if a different mechanical advantage were desired.

For still another example, if only a push or pull mode of operation is desired, the shape of the input portion of the lever, and thus the housing, might be quite different. It is of primary concern for the input portion that the effective moment arm for input force to the lever be established and the particular shape of the input portion is determined in preferred actuator by other factors such as the desire to use the same input fitting of the housing for both modes of operation rather than by turning the entire housing around and utilizing an additional input fitting for the push mode of operation.

There could also be equally appropriate alternatives to the thimble fitting for transferring the movement of the inner operating member to the end of the conversion spring, especially if no initial lost motion is needed. The same could be said for the particular shoulder means utilized for securing the other end of the spring to the lever.

Although the particular modulator valve operating to which the preferred embodiment is directed requires a directly proportional output force at a constant ratio with the input movement, a variable conversion spring could altrnatively be utilized if the ratio of the output force and input movement were by design to vary for proper modulator valve operation.

Further, even though the relative locations of the modulator valve and the throttle linkage dictate a rightangled conversion of directions by the preferred actuation, it should be obvious for one skilled in the art how to alter the actuator to change the angle between the effective moment arms if this is found desirable.

Figure 5:
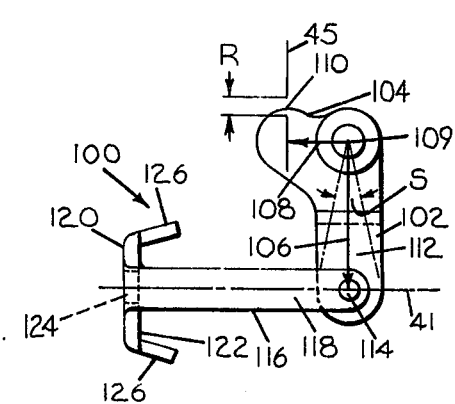
FIG. 5 is a plane view of an alternative lever configuration for the actuator.
Figure 6:
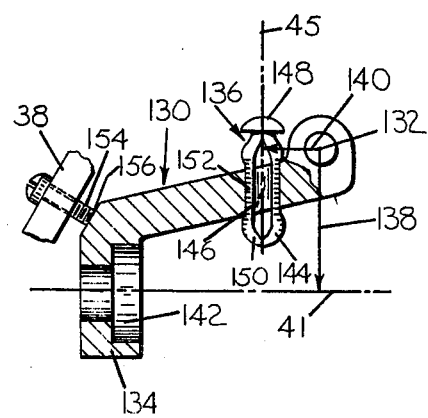
FIG. 6 is a plane view of another alternative lever configuration for the actuator.

Having established the general scope of the invention, two alternative levers are shown in FIGS. 5 and 6 as means for satisfying a particular problem which has been experienced in some applications of the mechanical actuator. It has been found that some transmission-modulator spool valve configurations include manufacturing tolerances which result in relatively wide variations in the distance between the spool valve at the normal postion and the actuator. As a result, the point of contact between the output portion of the lever and the actuator spacer might be located anywhere within an ⅛ inch segment of the central axis of the output fitting. This means that the initial angular orientation of the preferred lever 52 might vary as much as 20° which is too great a variation to insure proper alignment between the input portion of the lever and the conversion spring in the preferred embodiment.

Therefore, an alternative lever 100 is shown in FIG. 5 having features to compensate for these manufacturing tolerances. Designed to be substituted for the lever 52 above, the lever 100 has input portions 102 and output portions 104 that have respective effective moment arms 106 and 108 extending from lever axis 109 like moment arms 66 and 68 above. A point of contact 110, because of initial modulator valve normal positioning, might be located along central axis 45 anywhere within the segment indicated by the length R. The actual position of point 110 along the axis 45 will not appreciably alter the moment arm 108 but would cause the input portion 102 of the lever 100 to be at a corresponding location within the angular segment S. By locating the input portion 102 as near as possible to the effective moment arm 106, its actual location within the angular segment S has a negligible effect on the moment arm 106.

The lever 100 nevertheless has a configuration which enables it to be readily substituted for the lever 52. The end 112 of the input portion 102 is bifurcated to straddle the spring 54. A pin 114 is located at each leg of the bifurcated end 112 in general alignment with the central axis 41.

Pivotally mounted at the pins 114 is a swing member 116 of the lever 100 having two support arms 118 which respectively extend from the pins 114 to a common base plate 120. The support arms 118 are spaced-apart and are intended to extend along the sides of the spring 54 and its end 80 rests against a surface 122 base plate 120. The base plate 120 has a central opening 124 and a pair of spring retaining tabs 126. It can be seen that the base plate 120 receives the spring 54 and the inner operating member 34 in a manner similar to that of the input portion 62 of lever 52.

With the spring 54 applying force to the swing member 116, the input force to the lever 100 is directed at the pins 114. Since the pins 114 remain relatively aligned with the axis 41 at any position of the lever 100 which the tolerances of the spool valve might dictate, the effective moment arms 106 and 108 consistently provide the actuator with the desired output force for possible modulator spool valve positioning.

As seen in FIG. 6, another alternative lever 130 is capable of being pivotally mounted within the housing 38 at a lever axis 132 rather than the lever 52 of FIGS. 1 through 4. The lever 130 includes input portion 134 and output portion 136 for respective effective moment arms 138 and 140 like moment arms 66 and 68 above. The input portion 134 includes an opening 142 therethrough which is similar to and provides the same functions as the opening 72 of the lever 52. However, the output portion 136 included a friction post 144 positioned within a hole 146 in the lever 130. The post 144 and hole 146 are coaxially aligned with central axis 45 so that a head 148 of post 144 will contact with the actuator spacer 70.

Although other means might be employed to accomplish the desired results, the post 144 has a three-pronged shaft 150 in which each prong is biased to press against the interior wall of the hole 146 at a rough surface 152. It is the purpose of this configuartion to provide friction contact between the post 144 and the hole 146 to maintain the post 144 in a fixed relationship to the hole 146 unless a force of about 25 pounds is applied in either direction along axis 45.

Although lever 100 of FIG. 5 can be set in the push or pull mode of operation in the same manner as lever 52 of FIGS. 1 through 4, this is not true of lever 130. To establish the proper position of post 144 relative to the hole 146 of lever 130, it is initially positioned with the hand 148 extended upwardly. As a result, the entire lever 130 is in initially oriented to a position located in a counter-clockwise direction from the position shown in FIG. 6 in alignment with the axis 41. Pulling the inner operating member 34 with the throttle fully depressed in the same manner as described above causes the lever 130 to assume the position as shown in FIG. 6. As this position is obtained a force of about 9 pounds on the inner operating member 34, because of the mechanical advantage, will relocate the post 144 to a relative position within the hole 146 that results in the modulator valve being forced to the operating position To indicate to someone installing the actuator the desired postion of the lever 130, a set screw 154 added to the housing 38 for each of the pull mode of operation and the push mode of operation (not shown), to cause a positive contact at surface 156 of the lever to prevent further clockwise rotation.

After the inner operating member 34 is secured to the throttle linkage, the set screw 154 is retracted from the position shown to insure free movement of the lever 130 during throttle operation. When the lever 130 is properly set, the post 144 will apply a maximum force of 12.5 pounds for modulator spool valve positioning which 12.5 pounds is insufficient to move the post 144. The post 144 will, therefore, be in a fixed relationship with the rest of the lever 130 throughout its use since the throttle and actuator cannot produce a force even approaching the 25 pounds that would be required to dislodge the post 144.

I claim:

1. A mechanical actuator for a modulator valve of a transmission, said actuator being capable of responding to the linear travel of an operating member associated with the throttle which said linear travel corresponds to movement of said throttle, said actuator capable of providing an output force having a magnitude which varies in a predetermined manner according to the position of the operating member within at least a portion of the total of said linear travel of said operating member during said movement of said throttle, said output force capable of providing at least a portion of an input force for movement of said modulator valve against modulator valve biasing, the maximum length of said movement of said modulator valve by said input force being substantially less than the length of said portion of said total of said linear travel of said operating member, said actuator comprising:

a housing capable of being mounted in a fixed relationship to said transmission and of receiving therein said operating member;

a lever pivotally mounted within said housing and having an input portion with a first moment arm and an output portion with a second moment arm;

said output portion being aligned at said second moment arm with said modulator valve when said housing is mounted at said transmission;

means between said input portion of said lever and said operating member located within said housing for converting said position of said operating member within said portion of said total of said travel of said operating member to a normal signal force on said input portion at said first moment arm; and said normal signal force on said input portion causing said output force to be applied to said modulator valve by said output portion with said normal signal force and said output force being directly proportional at a ratio of the length of said second moment arm and said first moment arm.

2. A mechanical acutator as set forth in claim 1, wherein said means for converting said position of said operating member within said portion of said total travel to said normal signal force includes a spring having a predetermined rate which said spring is capable of acting on said input portion of said lever to provide said normal signal force corresponding to a spring distortion consistent with a change in the relative distance between said operating member and said input portion.

3. The mechanical actuator as set forth in claim 2, wherein said total of said travel is greater than said portion of said travel and further including means between said operating member and said spring for allowing said operating member at a location within said total of said travel which is not within said portion of said total of said travel so that said spring will not be distorted.

4. The mechanical actuator as set forth in claim 1, wherein said spring distortion is by compression and said predetermined rate of said spring is constant.

5. A mechanical actuator as set forth in claim 1 further including means for selectively responding to said linear travel of said operating member in either of two directions which might be selected to correspond to said movement of said throttle to said actuator.

6. A mechanical actuator as set forth in claim 1, wherein said first moment arm and said second moment arm are angularly disposed at about 90°.

7. A mechanical acutator as set forth in claim 6, further including means for selectively responding to said linear travel of said operating member in either of two directions which might be selected to correspond to said movement of said throttle to said actuator.

8. A mechanical acutator as set forth in claim 7, wherein said means for said selectively responding to said linear travel of said operating member includes means for selectively relocating the axis of said lever and for selectively reversing the direction in which said normal signal force will be applied to said input portion.

9. A mechanical actuator for a modulator valve of a transmission, said actuator being capable of responding to the linear travel of an operating member associated with the throttle which said linear travel corresponds to movement of said throttle by providing an output force which provides at least a portion of an input force for movement of said modulator valve against modulator valve biasing, said modulator valve having a maximum length of movement substantially less than said length of the total of said travel of said operating member during said movement of said throttle, said mechanical actuator comprising:

- a housing capable of being fixedly mounted to said transmission, said housing having an inlet fitting for receiving said operating member therein and an outlet fitting aligned with said modulator valve when said housing is mounted to said transmission;
- a lever pivotally mounted within said housing and having an input portion with a first moment arm and an output portion with a second moment arm, said first and second moment arms being disposed at about a right angle with respect to each other, said input portion being aligned with said inlet fitting for alignment with said operating member, said output portion being aligned with said outlet fitting for alignment with said modulator valve;
- a spring having a constant rate and capable of being mounted between said input portion and said operating member for compression when said operating member is in a location within a predetermined portion of a total of said linear travel, said compression providing a normal signal force on said input portion at said first moment arm which said normal signal force directly corresponds to a position of said operating member within said portion of said total of said linear travel; and
- said normal signal force on said input portion causing said output force to be applied to said modulator valve by said output portion with said normal signal force and said output force being directly proportional at a ratio of the length of said second moment arm and said first moment arm.

10. A mechanical actuator as set forth in claim 9, further including a lost motion fitting capable of being positioned between said spring and said operating member to allow initial movement of said operating member within said total of said linear travel before being within said portion of said total of said linear travel so that said normal force will not be produced by initial movement of said throttle.

11. A mechanical actuator as set forth in claim 9, wherein said output force is within a range of zero to about 12.5 pounds, said normal signal force is within a range of zero to about 5 pounds, said total of said linear travel of said operating member is about 1.5 inches, and said maximum length of said movement of said modulator valve is about 0.005 inches.

12. A mechanical actuator as set forth in claim 9, when said lever may selectively be mounted at one of two locations within said housing so that said normal signal force may be applied in a selected one of two opposite directions corresponding to the direction of initial movement of said operating member for initial movement of said throttle.

13. A mechanical actuator as set forth in claim 9, wherein said lever includes means for compensating for variations in the distance between said actuator and the position of said modulator valve within said transmission at which said modulator biasing is greater than said input force to thereby prevent movement of said modulator valve.

14. A mechanical actuating system for causing a modulator valve of a transmission to respond to movement of a throttle, said modulator valve receiving an input force for movement against modulator valve biasing, a maximum length of said movement of said modulator valve being predetermined, said mechanical actuating system comprising:

- an operating member secured to linkage of said throttle and capable of linear travel in response to movement of said throttle;
- a support housing fixedly mounted to said transmission, said housing having an inlet fitting for receiving said operating member therein and an outlet fitting aligned with said modulator valve;
- a lever pivotally mounted within said housing and having an input portion with a first moment arm and an output portion with a second moment arm, said first and second moment arms being disposed at about a right angle with respect to each other, said input portion aligned with said inlet fitting and said operating member, said output portion being aligned with said outlet fitting and said modulator valve;
- a spring having a constant rate and mounted between input portion and said operating member for compression when said operating member is located within a predetermined portion of a total of said linear travel, said predetermined portion of said total of said linear travel being substantially longer than said predetermined maximum length of said movement of said modulator valve, said compression providing a normal signal force on said input portion at said first moment arm which said normal signal force directly corresponds to a position of said operating member within said predetermined portion of said total of said linear travel; and
- said normal signal force on said input portion causing an output force which is at least a portion of said input force to be applied to said modular valve by said output portion with said normal signal force and said output force being directly proportional at a ratio of the length of said second moment arm and said first moment arm.

* * * * *